United States Patent
Lilienthal et al.

(10) Patent No.: US 6,877,972 B2
(45) Date of Patent: Apr. 12, 2005

(54) SPRAY URETHANE TOOL AND SYSTEM

(75) Inventors: Cal A. Lilienthal, Iowa City, IA (US); Anthony J. Link, North Liberty, IA (US); Steven M. Christian, Williamsburg, IA (US)

(73) Assignee: Lear Corporation, Southfield, MI (US)

( * ) Notice: Subject to any disclaimer, the term of this patent is extended or adjusted under 35 U.S.C. 154(b) by 339 days.

(21) Appl. No.: 10/141,641

(22) Filed: May 7, 2002

(65) Prior Publication Data

US 2003/0071386 A1 Apr. 17, 2003

Related U.S. Application Data

(60) Provisional application No. 60/330,157, filed on Oct. 16, 2001, now abandoned.

(51) Int. Cl.[7] .......................... B29C 33/30; B29C 41/08
(52) U.S. Cl. .......................... 425/73; 425/449; 425/453
(58) Field of Search .......................... 425/73, 98, 100, 425/449, 453; 264/309, DIG. 72

(56) References Cited

U.S. PATENT DOCUMENTS

| | | | |
|---|---|---|---|
| 3,599,282 A | * 8/1971 | Meyers et al. | 425/449 |
| 3,865,525 A | 2/1975 | Dunn | |
| RE30,130 E | * 10/1979 | Edwards | 425/453 |
| 4,205,031 A | 5/1980 | Almqvist et al. | |
| 5,370,831 A | * 12/1994 | Blair et al. | 264/309 |
| 5,674,570 A | 10/1997 | Fouvet | |
| 5,702,578 A | 12/1997 | Umeda et al. | |
| 5,763,020 A | 6/1998 | Yang | |
| 5,782,978 A | 7/1998 | Kinose et al. | |
| 5,985,036 A | 11/1999 | Anderle | |
| 6,001,181 A | 12/1999 | Bullen | |
| 6,156,249 A | * 12/2000 | Swenson | 425/453 |
| 6,159,291 A | 12/2000 | Morita et al. | |
| 6,197,115 B1 | 3/2001 | Barrey et al. | |
| 6,217,944 B1 | 4/2001 | Yoshida et al. | |
| 6,348,172 B1 | * 2/2002 | Barnes | 264/309 |
| 2001/0038039 A1 | 11/2001 | Schultz et al. | |

FOREIGN PATENT DOCUMENTS

| | | |
|---|---|---|
| EP | 0426317 A2 | 5/1991 |
| JP | 63-209816 | 8/1988 |
| JP | 2-190313 | 1/1989 |
| JP | 6-143291 | 5/1994 |

* cited by examiner

*Primary Examiner*—James P. Mackey
(74) *Attorney, Agent, or Firm*—Bill C. Panagos

(57) ABSTRACT

A method of forming a part with a solid urethane elastomer skin is provided, wherein the mold is moved by a mold manipulation tool to present differently oriented surfaces of the mold in a horizontal orientation when the urethane elastomer is sprayed on each of the differently oriented surfaces. A multi-axis robot is provided with a spray head that sprays the urethane elastomer onto a mold surface. A mold manipulator moves the mold that has a plurality of differently oriented mold surfaces so that the surface to be sprayed is held in a horizontal orientation as they are coated with the urethane elastomer and for a predetermined time period after spray coating until the urethane elastomer sets up.

5 Claims, 6 Drawing Sheets

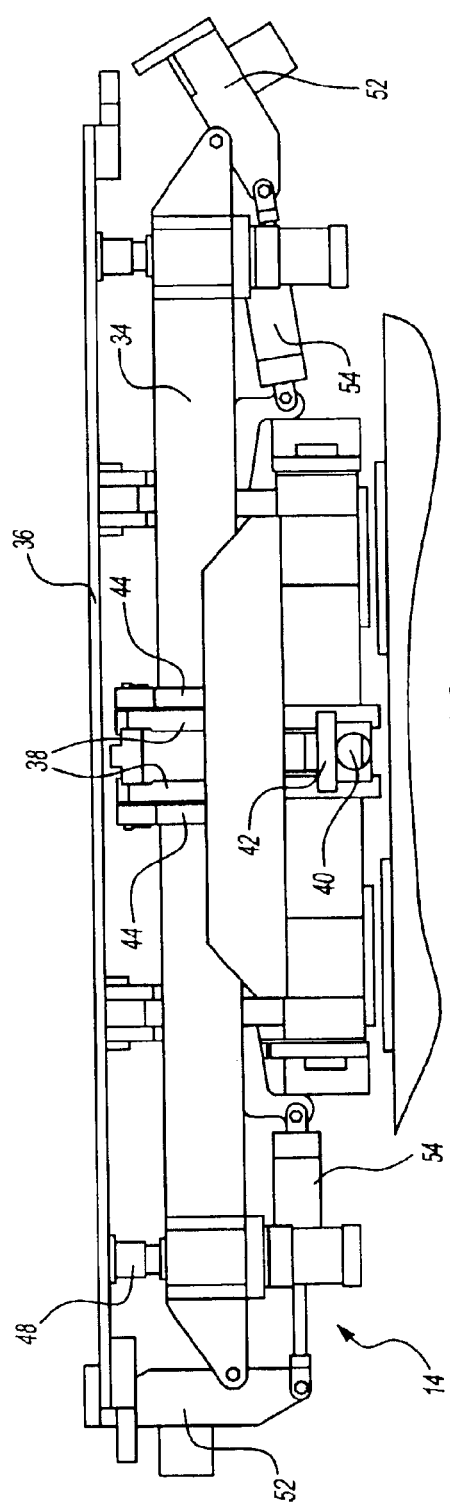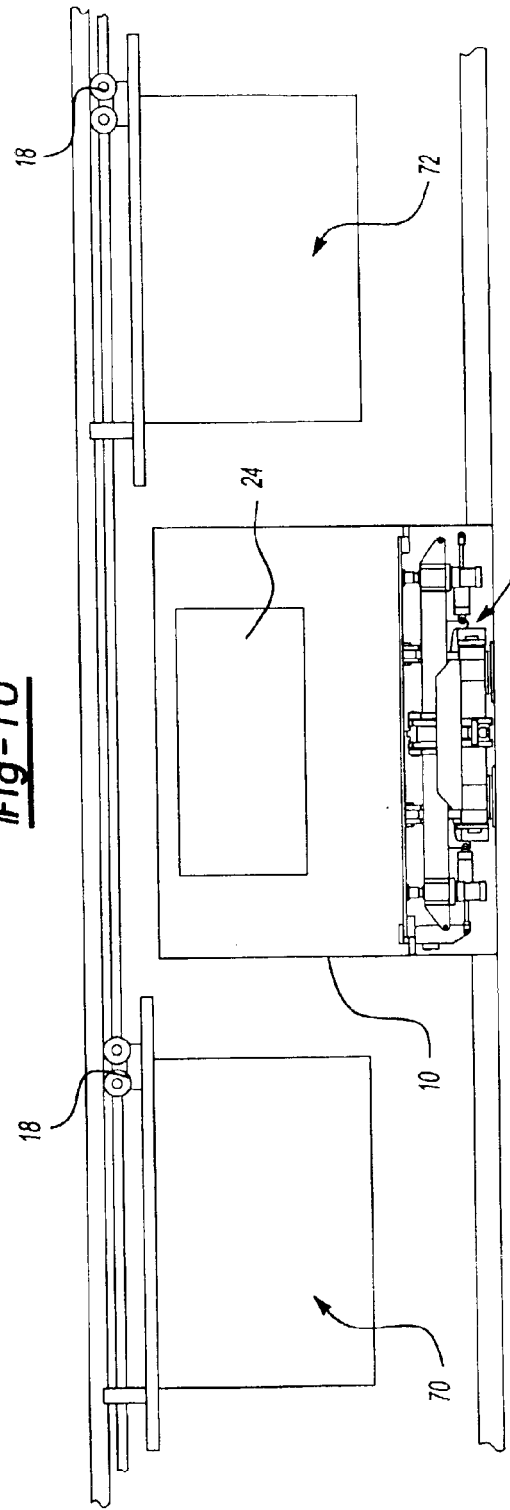

SPRAY URETHANE TOOL AND SYSTEM

CROSS-REFERENCE TO RELATED APPLICATIONS

This application claims the benefit of U.S. provisional application Ser. No. 60/330,157 filed Oct. 16, 2001, now abandoned.

BACKGROUND OF THE INVENTION

1. Field of the Invention

The present invention relates to a method and apparatus for applying spray urethane to form a skin layer of a part in a mold.

2. Background Art

Solid urethane elastomer material is used as part of a process for forming parts in a mold. The solid urethane elastomer is a two-part composition that is mixed at the spray head before applying the material to a mold. The urethane elastomer is formulated to set-up relatively quickly. For example, the urethane elastomer is sprayed from the spray head as a liquid and begins to set-up in about 10 to 15 seconds after it contacts the mold. In about two minutes, the urethane elastomer is cohesive and its surface is tack-free. Even with this relatively rapid set-up, when the urethane elastomer is sprayed on a vertical surface, the elastomer forms drips or runs on the vertical surface and may accumulate in liquid pools where a vertical surface meets a horizontal surface. It is also difficult to obtain a surface coating having relatively uniform thickness if the urethane elastomer is sprayed on a vertical surface because gravity causes the material to flow. On a horizontal surface, the urethane elastomer is easily applied to form a uniform thickness after it contacts the horizontal surface.

Examples of automotive parts that may include a urethane elastomer skin include instrument panels, inner door panels, consoles, glove box doors, steering wheel covers, body pillar covers, and the like. An example of a process for forming automotive parts having a urethane elastomer skin is provided below. In an in-mold painting process utilizing an aromatic urethane, the process would begin by applying paint to a mold release agent in the mold for the part. After painting, the aromatic or aliphatic urethane elastomer is sprayed onto the paint layer to form a wall having a thickness of approximately ¹⁄₁₆ to ⅛ inch. However, if the part has surfaces that are not substantially horizontal, but are vertical or sloped, the urethane elastomer will form drips and pools and have areas of reduced thickness. After the urethane elastomer has solidified, an injection molded part may be inserted into the mold on top of the urethane elastomer skin. The injection molded part provides reinforcement ribs, frames for installation of components such as air bags or instruments, and fastener receptacles. Foam is then injected into the mold to fill the mold and secure the injected molded part to the urethane elastomer skin. The part may then be removed from the mold and trimmed.

Recent developments in the manufacture of vehicles include incorporation of a plurality of air bags in the vehicle interior. Parts such as inner trim panels for doors, instrument panels and steering wheel covers that may be formed by the above-described process must be formed with more uniform wall thickness to meet part specifications for air bag covers.

There is a need for a method and apparatus for forming complexly shaped parts with a solid urethane elastomer skin having a relatively uniform wall thickness. There is also a need for a method and apparatus for making parts with a solid urethane elastomer skin that eliminates drips, runs and pools of urethane elastomer material on the part while assuring adequate coverage of a relatively uniform wall thickness on the part. By eliminating waste and reducing the amount of material required to form the urethane elastomer skin on a part, considerable savings can be achieved.

SUMMARY OF THE INVENTION

According to one aspect of the present invention, an apparatus for forming a part and a method of forming a part with a solid urethane elastomer skin is provided, wherein the mold is moved by a mold manipulation tool to present differently oriented surfaces of the mold in a horizontal orientation when the urethane elastomer is sprayed on each of the differently oriented surfaces.

According to another aspect of the invention, an automated system is provided for forming a solid urethane elastomer skin for a part, wherein a multi-axis robot is provided with a spray head that sprays the urethane elastomer onto a mold that is secured to a mechanism that moves the mold. The mold has a plurality of differently oriented mold surfaces that must be coated with the urethane elastomer. The mold may be moved by several different mechanisms, including hydraulic or pneumatic cylinder actuators or for more complex mold movement the mold could be moved by a multi-axis robot.

According to another aspect of the invention, movement of the spray head by a multi-axis robot and movement of the mold are coordinated by a computer process control system so that the portion of the mold to which the spray head is directed is held in a substantially horizontal orientation whenever the spray head is spraying the urethane elastomer on that portion of the mold. The apparatus for moving the mold is also preferably programmed to only move the mold after the urethane elastomer has been provided with enough time to initially set-up so that runs, drips and pools of elastomeric material are not formed.

These and other aspects of the present invention will be better understood in view of the attached drawings and in light of the following detailed description of an embodiment of the invention.

BRIEF DESCRIPTION OF THE DRAWINGS

FIG. 10 is a front elevation view of the mold manipulator; and

FIG. 11 is a rear plan view of a production line including mold carriers and the urethane elastomer application station.

DETAILED DESCRIPTION OF THE PREFERRED EMBODIMENTS

Figure 1:
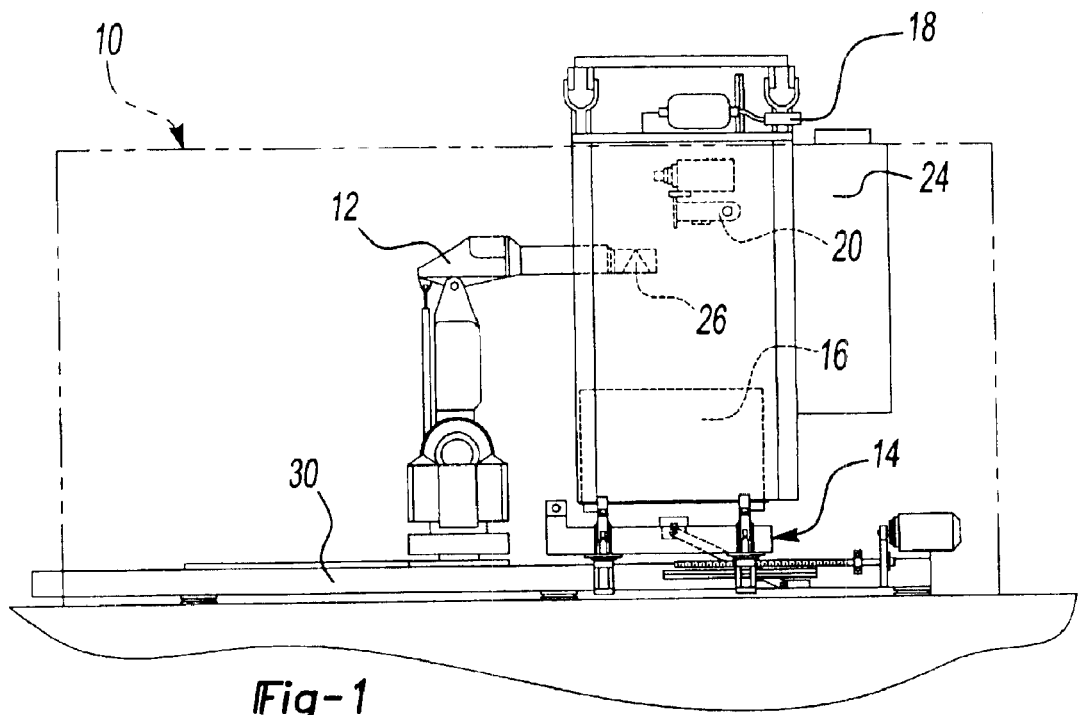
FIG. 1 is a side elevation view of a urethane elastomer spray application booth.
Figure 2:
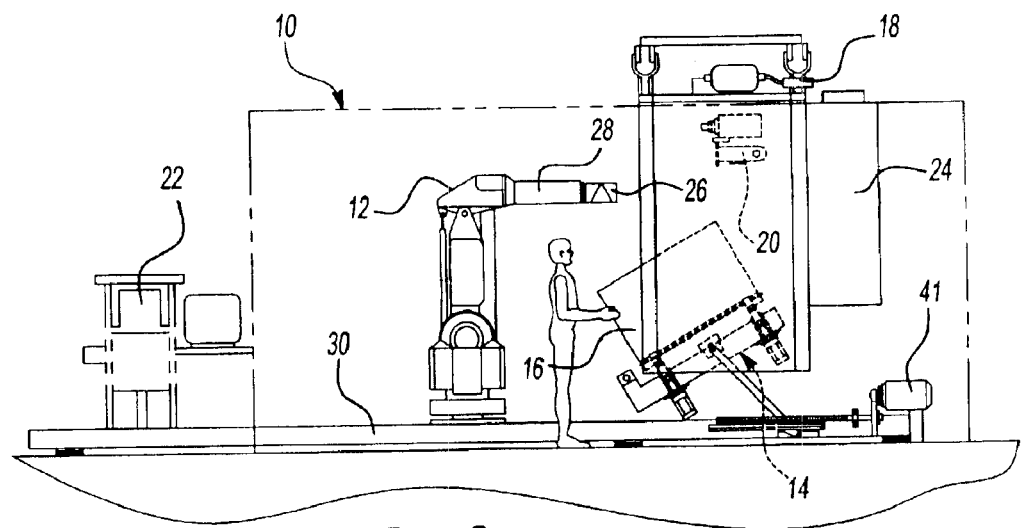
FIG. 2 is a side elevation view of a urethane elastomer spray application booth showing the mold in a tilted position.

Referring now to FIGS. 1 and 2 a urethane spray application booth is generally indicated by reference 10. A multi axis robot 12 is provided within the booth 10. The multi axis robot 12 may also be referred to herein as a spray applicator robot. A mold manipulator, generally indicated by reference 14, is used to move a mold 16 that is used form parts in a molding process. The mold 16 is carried into and out of the booth 10 by a carrier 18. A heater 20 is provided in the spray booth to heat the mold to the desired temperature to cure urethane elastomer. A metering unit 22 is used to meter two different components of the urethane elastomer composition that react and cure to form a urethane skin in the mold 16. The booth 10 is provided with an exhaust system 24 that filters and exhausts air from the booth 10.

The robot 12 carries a spray head 26 on the end of a robot arm 28. The spray head 26 is used to spray the urethane elastomer and may also be provided with a in-mold paint spray nozzle. The robot 12 is mounted on a base 30.

Figure 3:
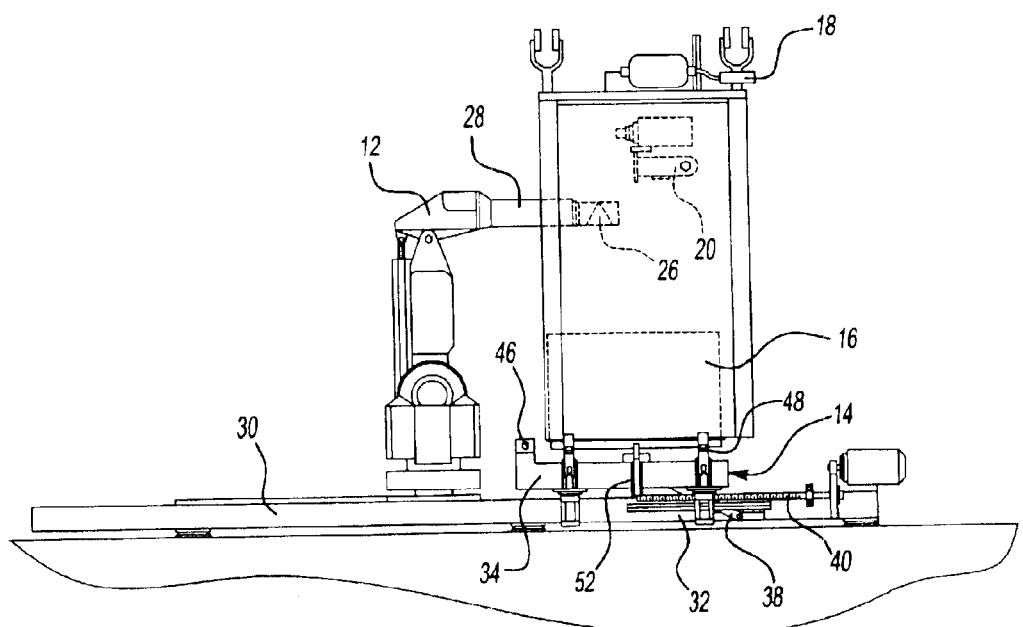
FIG. 3 is a side elevation view of a spray applicator robot, part mold, and mold manipulator.
Figure 4:
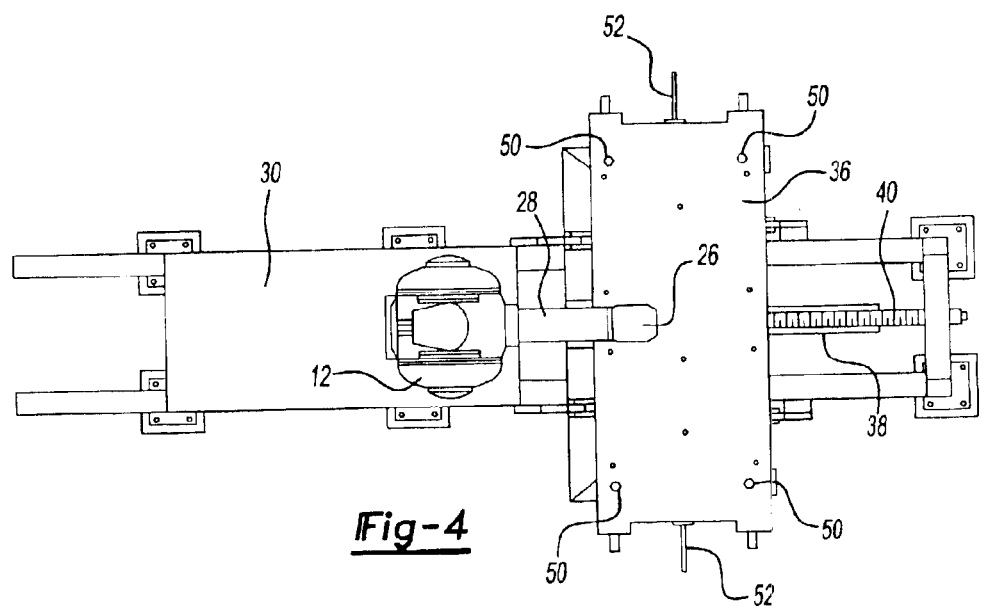
FIG. 4 is a top plan view of the spray applicator robot, part mold and mold manipulator.

Referring now to FIGS. 3 and 4, the robot 12 and mold manipulator 14 are shown in greater detail. The robot 12 is mounted on the base 30 with the robot arm 28 extending toward the mold 16. The mold is shown in FIG. 3 in a horizontal orientation as it would be when transported into the spray booth by the carrier 18. A counterweight 32 is provided to counter balance the weight of a platform 34, a platen 36, and mold 16 as they are tilted by a tilting link 38. The tilting link 38 is driven by means of a ball screw drive 40 that is connected to the tilting link by means of a carriage 42. The tilting link 38 is connected to a bracket 44 that is secured to the bottom of the platform 34. Platform 34 pivots on a platform pivot 46 that allows the mold 16 to be pivoted from 0 to 90 degrees allowing the mold to be manipulated so that it presents a substantial horizontal surface onto which the spray head 26 directs urethane elastomer. By the term "substantially horizontal" it is meant that the surface is at an angle of inclination of less than 30 degrees relative to horizontal.

Figure 5:
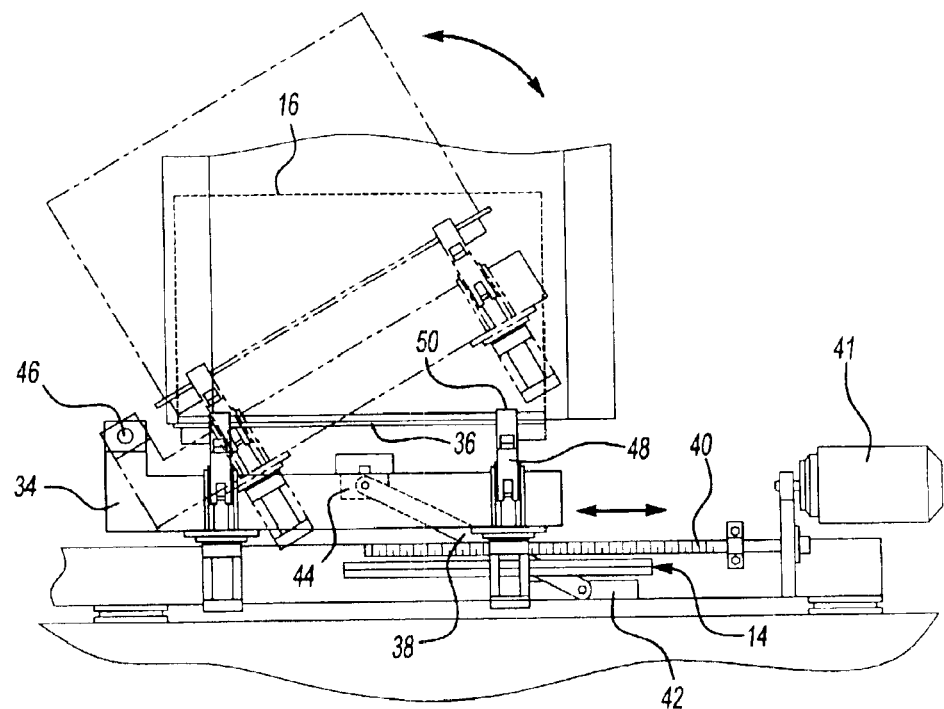
FIG. 5 is an enlarged side elevation view of the part mold and mold manipulator.

Referring more specifically to FIG. 5, with continuing reference to FIGS. 3 through 4, the mold manipulator 14 is shown in greater detail. The mold 16 is secured to the platen 36 on which the mold 16 is carried into the spray booth 10. The platen is precisely located by means of a plurality of shot pin assemblies 48 that are secured to the platform 34 and each engage one of a plurality of shot pin receptacles 50 in the platen 36 when the mold 16 is moved on the platen 36 into the booth 10.

As shown in FIGS. 3 and 4, grabbers 52 are provided on opposite ends of the platform 34 to secure the platen 36 and mold 16 to platform 34 as the mold 16 is tilted by the mold manipulator 14. The grabbers 52 are actuated by means of pneumatic cylinders 54 but could also be operated by means of hydraulic cylinders. The ball screw drive 41 includes a motor 41 that drives the ball screw drive 40 to move the carriage 42, tilting link 38 and platform 34. As shown in FIG. 5, the platform 34 is in its horizontal orientation and the carriage 42 is in its lowered position. As shown in phantom lines in FIG. 5, the platform may be tilted by moving the carriage to the left as shown in FIG. 5 thereby raising the bracket 44 and platform 34.

Figure 6:
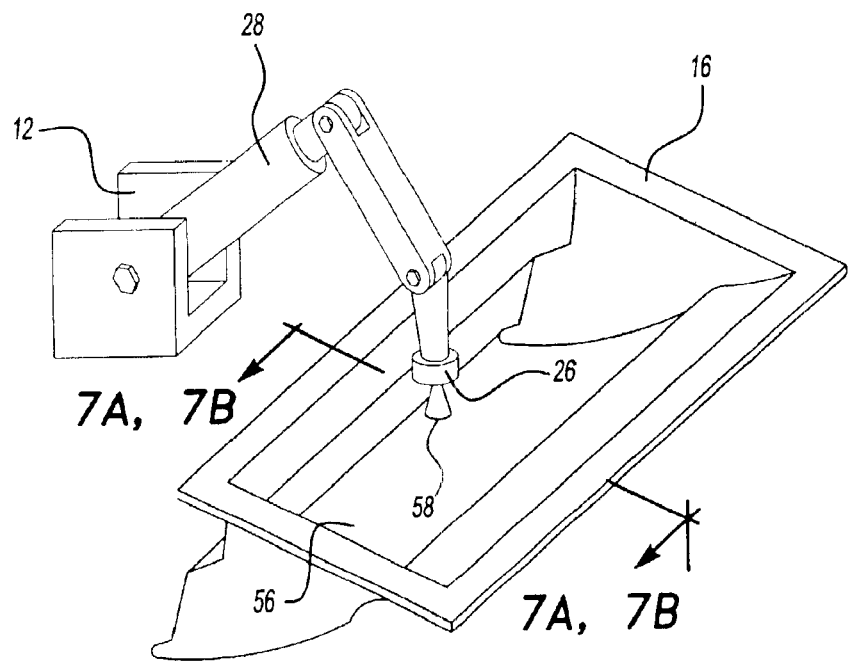
FIG. 6 is a diagrammatic perspective view of a spray applicator robot and mold showing the mold being held to present a substantially horizontal surface to be sprayed.

Referring now to FIG. 6, the robot 12 and mold 16 are shown diagrammatically. The mold 16 includes a mold surface 56 toward which a spray 58 is directed by the spray head 26. The spray head 26 is secured to the end of the robot arm 28 that forms part of the robot 12.

Figure 7A:
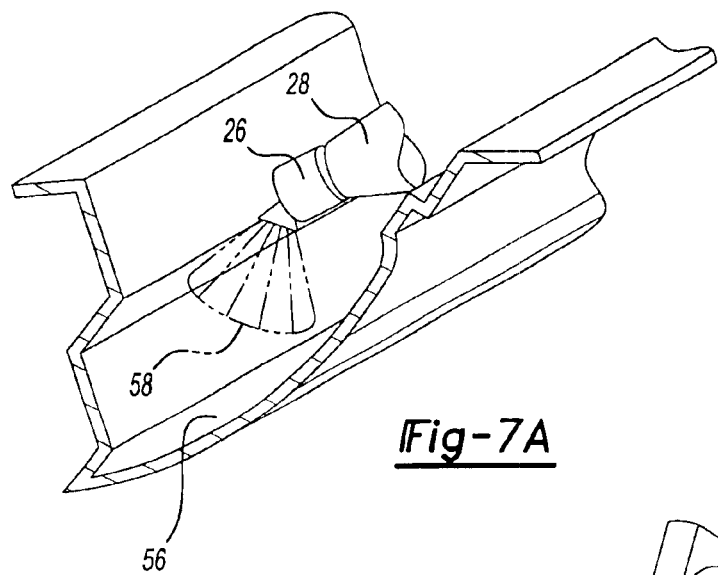
FIG. 7A is a cross-sectional view taken along line A—A in FIG. 6.
Figure 7B:
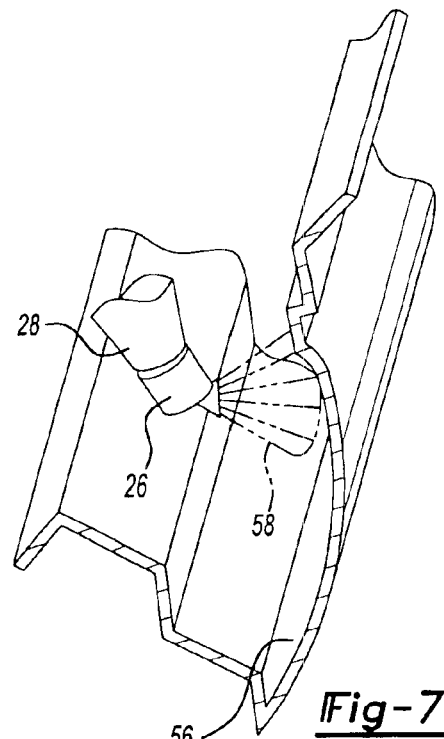
FIG. 7B is a cross-sectional view taken along line A—A in FIG. 6 showing the mold surface as the mold would be rotated to present a generally horizontal application surface.

Referring now to FIG. 7A, the robot arm 28 is shown with the spray head 26 directing the spray 58 downwardly onto the horizontal portion of the mold surface 56. Referring now to FIG. 7B, the mold is shown rotated (clockwise as shown) by the mold manipulator so that a further portion of the mold surface 56 shown in FIG. 7A is now arranged in a generally horizontal orientation so that the spray 58 may be directed on that now horizontal portion of the mold surface 56. In a similar manner, the mold manipulator rotates the mold such that the respective further mold surfaces 56 are presented generally horizontally so that the spray 58 may accordingly be directed on that now horizontal portion of the mold surface 56. This reduces drips and runs.

Figure 8:
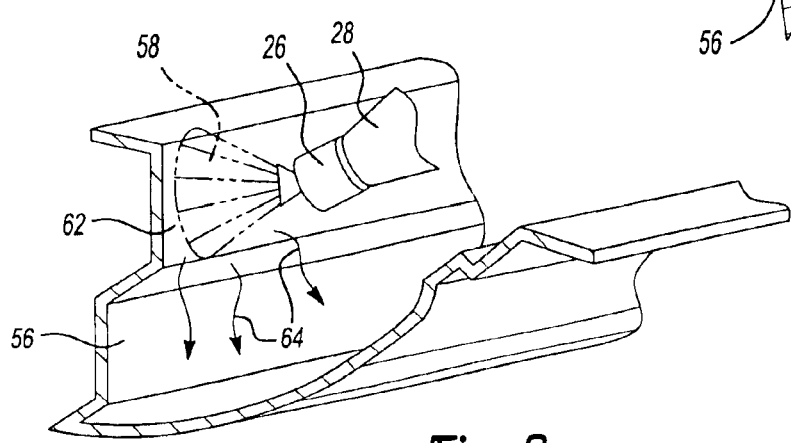
FIG. 8 is a cross-sectional perspective view showing a spray urethane application tool applying urethane elastomer

Referring now to FIG. 8, a prior art system is shown operating on the same part shown in FIGS. 7A and 7B with the spray 58 being directed toward a vertical target surface portion 62 of the mold surface 56. When the spray 58 is directed toward the vertical target surface 62 drips/runs 64 form on the lower portion of the vertical target surface. A pool (not shown) of urethane elastomer may accumulate in the lower part of the mold 16 creating an unwanted buildup of urethane elastomer in that area.

Figure 9:
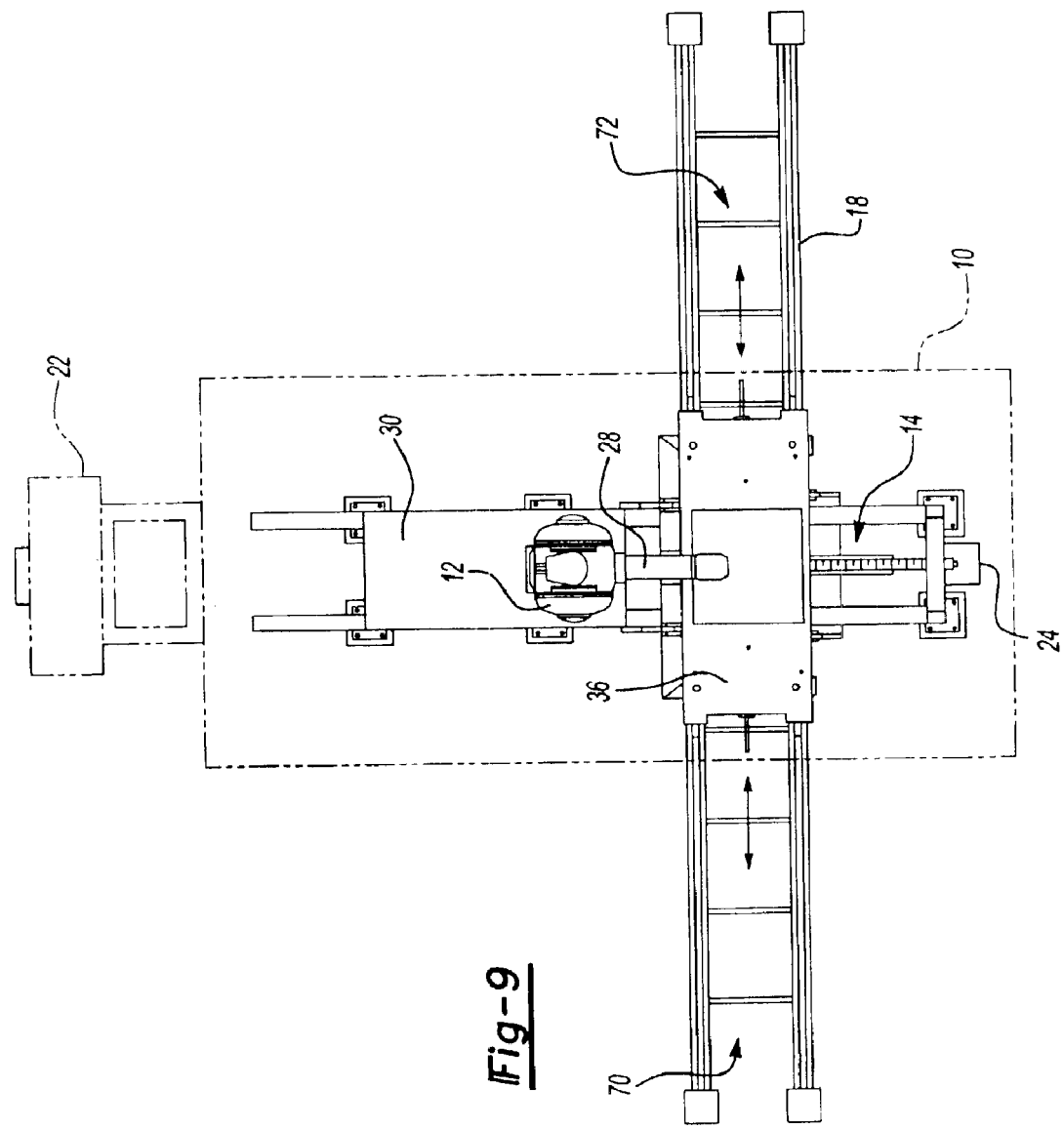
FIG. 9 is a plan view of a robot spray applicator and mold manipulator.

Referring now to FIG. 9 the multi axis robot 12 is shown with a mold manipulator 14 in a top plan view. The carrier 18 extends from a loading station 70 through the urethane spray application booth 10 and to a exit station 72.

Referring now to FIG. 10, the mold manipulator 14 is shown in a front elevation view. The mold manipulator includes a platen 36 that is secured to the platform 34 by means of the shot pin assemblies 48 and grabbers 52. The ball screw drive 40 is connected to the carriage 42 that drives the tilting links 38. The tilting links 38 are connected to a bracket 44 that is secured to the platform 34. As the ball screw drive 40 is moved toward and away from the robot 12 the platform 34 and platen 36 are pivoted about the platform pivot 46. The grabbers 52 are moved by pneumatic cylinders 54 to secure the platen 36 to the platform 34 as shown on the left side of FIG. 10 and release the platen 36 as shown on the right side of FIG. 10. Cylinders 54 are extended to lock the grabbers 52 onto the platen 36. Cylinders 54 are retracted to release the platen 36. When the mold 16, platen 36, and platform 34 are tilted both of the grabbers 54 are in the position shown on the left side of FIG. 10. When the mold 16 and platen 36 are indexed through the booth 10 the grabbers 52 are retracted to the position on the right side of FIG. 10.

Referring now to FIG. 11, the spray booth 10 is shown in conjunction with the loading station 70 and exit station 72. The mold manipulator 14 is shown below the urethane spray application booth 10. Also shown in FIG. 11 is the filter inlet for the exhaust system 24 of the booth 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for forming a part having a urethane elastomer skin, comprising:
   a mold defining a mold cavity having a mold surface;
   a mold manipulator supporting the mold for movement;
   a multi-axis robot having an arm;
   a spray head supported by the arm that sprays the urethane elastomer on the mold surface;
   wherein the mold manipulator moves the mold so that the surface of the mold that receives the urethane is held in a horizontal orientation when the spray head sprays urethane on the mold surface.

2. The apparatus of claim 1 wherein the mold manipulator includes a platform and a platen that are pivotally secured together along a side of the platform nearest the robot, and are also linked by a tilting link that is driven by a linear motion drive that tilts the mold manipulator.

3. The apparatus of claim 2 wherein the linear motion drive is a ball screw drive.

4. The apparatus of claim 1 wherein the apparatus further comprises a booth that encloses the mold, mold manipulator, and robot.

5. The apparatus of claim 4 wherein the mold manipulator includes a platform and the mold is indexed into and out of the booth on the platform.

* * * * *